United States Patent
Oh et al.

(10) Patent No.: US 9,354,768 B2
(45) Date of Patent: May 31, 2016

(54) METHOD AND APPARATUS FOR PROVIDING A WIDGET

(75) Inventors: Yoo-ra Oh, Seoul (KR); Pil-eun Yang, Seoul (KR); Sung-ju Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 524 days.

(21) Appl. No.: 13/025,761

(22) Filed: Feb. 11, 2011

(65) Prior Publication Data

US 2011/0202883 A1 Aug. 18, 2011

(30) Foreign Application Priority Data

Feb. 12, 2010 (KR) ........................ 10-2010-0013646

(51) Int. Cl.
*G06F 3/0481* (2013.01)

(52) U.S. Cl.
CPC .......... *G06F 3/0481* (2013.01); *G09G 2340/14* (2013.01)

(58) Field of Classification Search
CPC .... G06F 3/048; G06F 3/04817; G06F 3/0481
USPC ........................................................ 715/804
See application file for complete search history.

(56) References Cited

U.S. PATENT DOCUMENTS

| | | | | |
|---|---|---|---|---|
| 6,754,137 B1 * | 6/2004 | Bourquin et al. | ................ | 368/11 |
| 7,738,320 B2 * | 6/2010 | Taha | ................ | 368/10 |
| 2007/0130541 A1 * | 6/2007 | Louch et al. | .................. | 715/804 |
| 2007/0260999 A1 * | 11/2007 | Amadio et al. | ................ | 715/804 |
| 2007/0271376 A1 * | 11/2007 | Yach | ............... | 709/224 |
| 2008/0034047 A1 * | 2/2008 | Rosenberg et al. | ............ | 709/206 |
| 2008/0082930 A1 * | 4/2008 | Omernick et al. | ............ | 715/765 |
| 2008/0141153 A1 * | 6/2008 | Samson et al. | ................ | 715/769 |
| 2008/0235602 A1 * | 9/2008 | Strauss et al. | ................ | 715/762 |
| 2008/0319818 A1 * | 12/2008 | Gurdin et al. | .................... | 705/8 |
| 2009/0019385 A1 * | 1/2009 | Khatib et al. | ................. | 715/765 |
| 2009/0187841 A1 * | 7/2009 | Chaudhri et al. | ............. | 715/767 |
| 2009/0249282 A1 * | 10/2009 | Meijer et al. | .................. | 717/104 |
| 2009/0259958 A1 | 10/2009 | Ban | | |
| 2009/0288014 A1 | 11/2009 | Fujioka | | |
| 2010/0138763 A1 * | 6/2010 | Kim | .............................. | 715/765 |
| 2011/0004851 A1 * | 1/2011 | Nurmi et al. | .................. | 715/853 |

FOREIGN PATENT DOCUMENTS

| | | |
|---|---|---|
| JP | 10319139 | 12/1998 |
| KR | 1020080023891 | 3/2008 |
| KR | 1020090013393 | 2/2009 |
| KR | 1020090107638 | 10/2009 |
| KR | 1020100043612 A | 4/2010 |

* cited by examiner

*Primary Examiner* — Tadeese Hailu
*Assistant Examiner* — Blaine Basom
(74) *Attorney, Agent, or Firm* — The Farrell Law Firm, P.C.

(57) ABSTRACT

A method of providing a widget includes displaying a first widget indicating time, and displaying first information indicating an attribute of a second widget and second information specifying the first information based on a user's selection on the first widget. The second widget includes the first information and the second information.

9 Claims, 8 Drawing Sheets

METHOD AND APPARATUS FOR PROVIDING A WIDGET

PRIORITY

This application claims priority to Korean Patent Application No. 10-2010-0013646, filed on Feb. 12, 2010, in the Korean Intellectual Property Office, the contents of which are incorporated herein by reference.

BACKGROUND OF THE INVENTION

1. Field of the Invention

The present invention relates generally to a method and apparatus for providing a widget, and more particularly to, a method and apparatus for providing a synthesis widget combining a time widget and a widget having another concept.

2. Description of the Related Art

A widget is a Graphical User Interface (GUI) that provides a user who interacts with an operating system or an application with a unique method. Currently, users of computers or portable devices such as mobile devices may use various widgets to easily access useful information such as time and weather. Current widgets are also configured to provide users with a piece of information in accordance with platforms.

However, there is a need for a synthesis widget combining a time widget and a widget of another concept.

SUMMARY OF THE INVENTION

The present invention provides a synthesis widget capable of combining information of various widgets.

The present invention also provides a synthesis widget combining a widget having time or space concept and a widget having another function.

The present invention also provides a synthesis widget that provides a user with various services in synthesis of a widget having time or space concept that is most necessary for a lift and stock or weather.

The present invention also provides an interactive service in a simple widget form to provide a widget having time or space concept with a positioning information service.

According to an aspect of the present invention, there is provided a method of providing a widget, which includes displaying a first widget indicating time, and displaying first information indicating an attribute of a second widget and second information specifying the first information based on a user's selection on the first widget, wherein the second widget includes the first information and the second information.

According to another aspect of the present invention, there is provided a method of providing a widget, which includes displaying a first widget indicating time, and displaying first information of a second widget relating to time displayed on the first widget and second information relating to time different from the first information based on a user's selection on the first widget, wherein the second widget includes the first information and the second information.

According to another aspect of the present invention, there is provided an apparatus for providing a widget, which includes a display unit for displaying the widget, a storage unit for storing a first widget indicating time and a second widget, and a widget synthesis unit for displaying first information indicating an attribute of the second widget and second information specifying the first information based on a user's selection on the first widget.

According to another aspect of the present invention, there is provided an apparatus for providing a widget, which includes a display unit for displaying the widget, a storage unit for storing a first widget indicating time and a second widget relating to time displayed on the first widget, and a widget synthesis unit for displaying first information relating to time displayed on the first widget and second information relating to time different from the first information based on a user's selection on the first widget.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE INVENTION

Hereinafter, the present invention will be described in detail by explaining embodiments of the invention with reference to the attached drawings. Like reference numerals in the drawings denote like elements. In the following description of the present invention, a detailed description of known functions and configurations incorporated herein will be omitted for clarity and conciseness.

Figure 1:
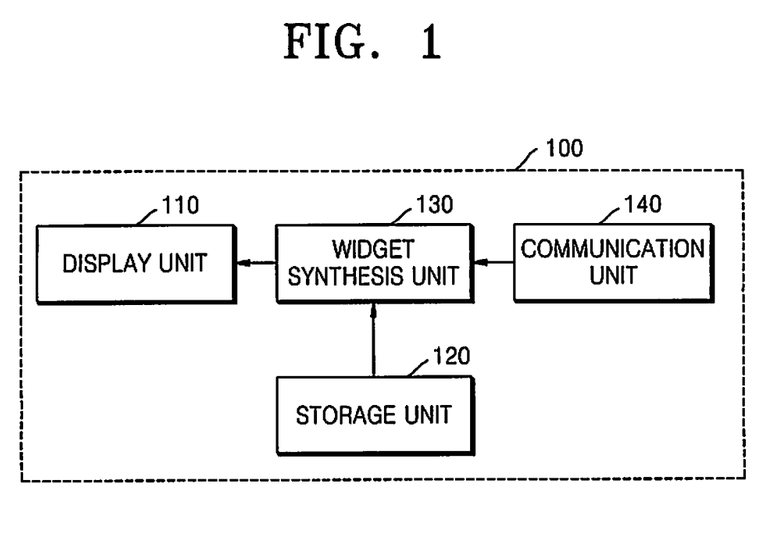
FIG. 1 illustrates an apparatus for providing a widget according to an embodiment of the present invention.

FIG. 1 illustrates an apparatus 100 for providing a widget according to an embodiment of the present invention. Referring to FIG. 1, the apparatus 100 includes a display unit 110, a storage unit 120, a widget synthesis unit 130, and a communication unit 140.

The display unit 110 displays the widget, and may include a touch screen (not shown) having a touch-detection surface sensor that receives an input from a user based on a haptic contact and/or a tactile contact.

The storage unit 120 stores a first widget showing time and a second widget that is related or unrelated to time. In an embodiment, the storage unit 120 may store a first widget including a clock icon showing time and a second widget relating to time displayed on the first widget. The first widget is referred to herein as a clock widget. The storage unit 120 may include a Read Only Memory (ROM) or a Random Access Memory (RAM), and include at least one magnetic disk storage device, a flash memory device, or a non-volatile memory such as a non-volatile solid-state memory device.

The widget synthesis unit 130 displays first information and second information included in the second widget on the first widget. The first information indicates an attribute of the second widget. The second information specifies the first information based on a user's selection. The widget synthesis unit 130 may display the first information on a clock icon of a clock widget that is a type of first widget. The first widget relates to time and is not limited to the clock widget. For example, the first widget may be a calendar widget.

The widget synthesis unit 130 may display the second information specifying the first information included in the second widget outside the clock icon according to the user's selection. For example, the second widget may be a time-related weather t or stock widget. However, the second widget is not limited to a time-related widget. If the second widget is the time-related weather widget, the first information is weather information of current time, and the second information is selectable location information. If the second widget is the time-related stock widget, the first information is stock information of current time, and the second information is selectable stock. This will be described in more detail with reference to FIGS. 2A through 3D.

The communication unit 140 receives widget information from an external server through a communication network if the apparatus 100 for providing the widget is updated. The communication unit 140 may communicate with a cellular phone network, a wireless network such as Local Area Network (LAN) and/or a Metropolitan Area Network (MAN), Intranet, and/or the Internet or World Wide Web (WWW), and other devices through wireless communication. Such wireless communication includes GSM (Global System for Mobile Communications), EDGE (Enhanced Data GSM Environment), HSDPA (High-Speed Downlink Packet Access), W-CDMA (Wideband Code Division Multiple Access), CDMA (Code Division Multiple Access), TDMA (Time Division Multiple Access), Bluetooth, Wi-Fi (Wireless Fidelity) such as IEEE 802.11a, IEEE 802.11b, IEEE 802.11g and/pr IEEE 802.11n, VoIP (Voice Over Internet Protocol), Wi-MAX, an e-mail protocol such as IMAP (Internet Message Access Protocol) and/or POP (Post Office Protocol), XMPP (eXtensible Messaging and Presence Protocol), SIMPLE (Session Initiation Protocol for Instant Messaging and Presence Leveraging Extentions and/or IMPS (Instant Messaging and Presence Service), and/or instant messaging such as SMS (Short Message Service), or another suitable communication protocol that has not been developed at the time the present application was filed. However, the present invention is not limited thereto, and the wireless communication may use any one of a plurality of communication standards, protocols, and technologies.

FIGS. 2A through 2D illustrate widgets that are a synthesis of a time widget 210 and information 220 and 230 included in a weather widget (not shown) according to an embodiment of the present invention.

Figure 2A:
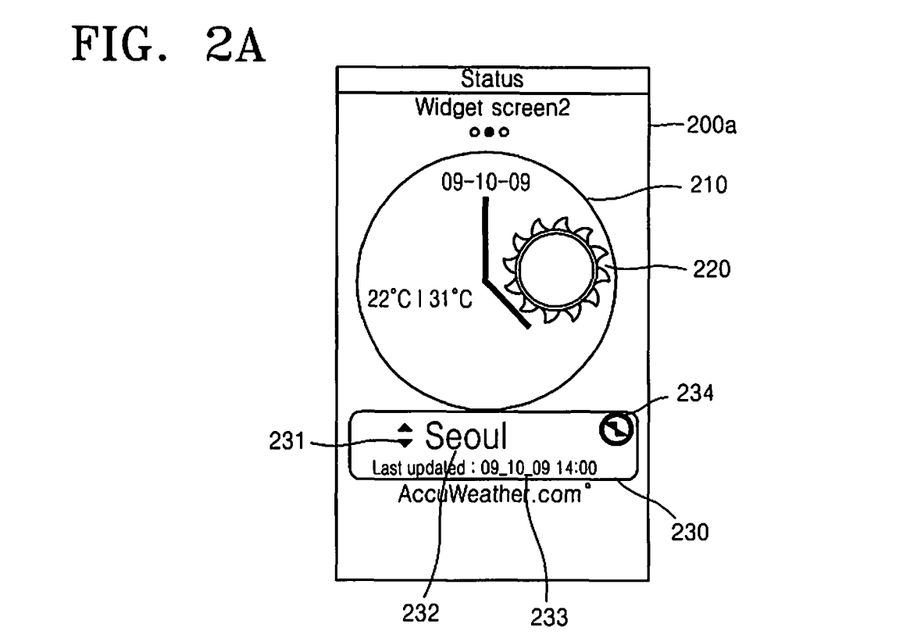
FIGS. 2A through 2D illustrate a widget that is a synthesis of a time widget and weather widgets according to an embodiment of the present invention.

Referring to FIG. 2A, the widget 200a is a synthesis of the time widget 210 and information 220 and 230 included in the weather widget. The time widget 210 illustrates a clock icon in an analog clock form, but may provide a clock icon in a digital clock form.

The information 220 included in the weather widget is displayed on the time widget 210. In the present embodiment, the information 220 included in weather widget may be displayed on the time widget 210 as icon types. The icon 220 may be displayed on the clock icon of the time widget 210 as the icon 220 that is intuitive to weather. The icon 220 may include text or graphic information indicating a temperature. The icon 230 that sets a specific location is displayed outside the clock icon of the clock widget 210. The icon 230 may display a change key 231 used to change such information as a previously set specific location, a specific location 232, a recently updated time 233, and an update icon 234. A user may change the previously set specific location when activating the change key 231 through a finger tap, and may receive weather information regarding a current location from a server (not shown) that provides external weather information when activating the update icon 234 through the finger tap. The weather icon 220 shows weather of the specific location 232 at the recently updated time 233.

Figure 2B:
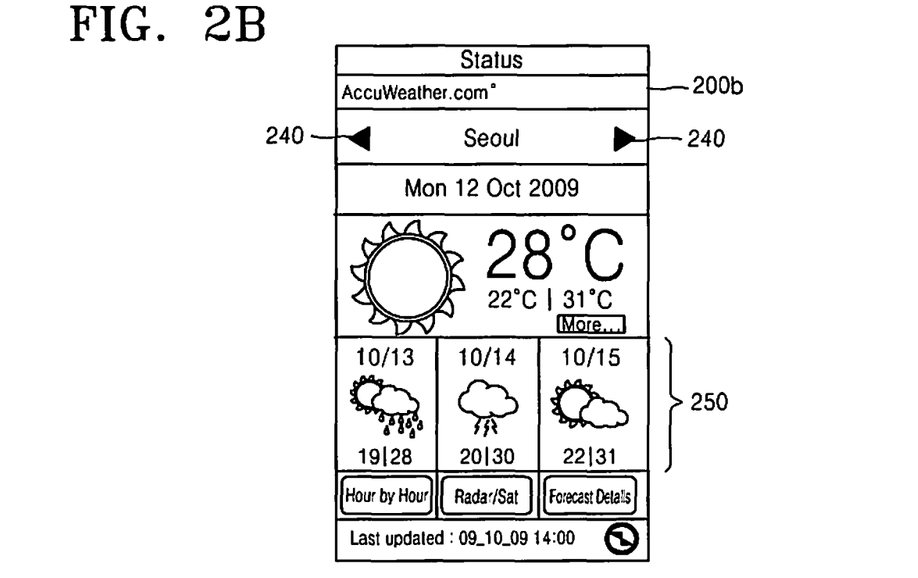

In response to the activation of the weather icon 220 through the finger tap, a user interface that provides detailed weather information regarding a current specific location is displayed. Referring to FIG. 2B, the user interface 200b that provides detailed weather information may display weather information regarding a plurality of dates, etc. Further, the user interface 200b may display a change key 240 that changes such information as a specific location, a recently updated date, and an update icon.

Figure 2C:
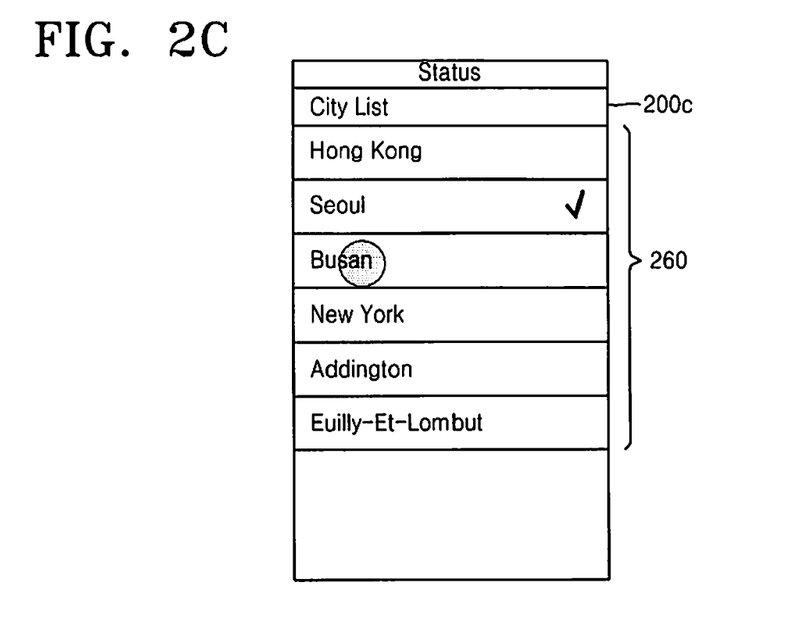
Figure 2D:
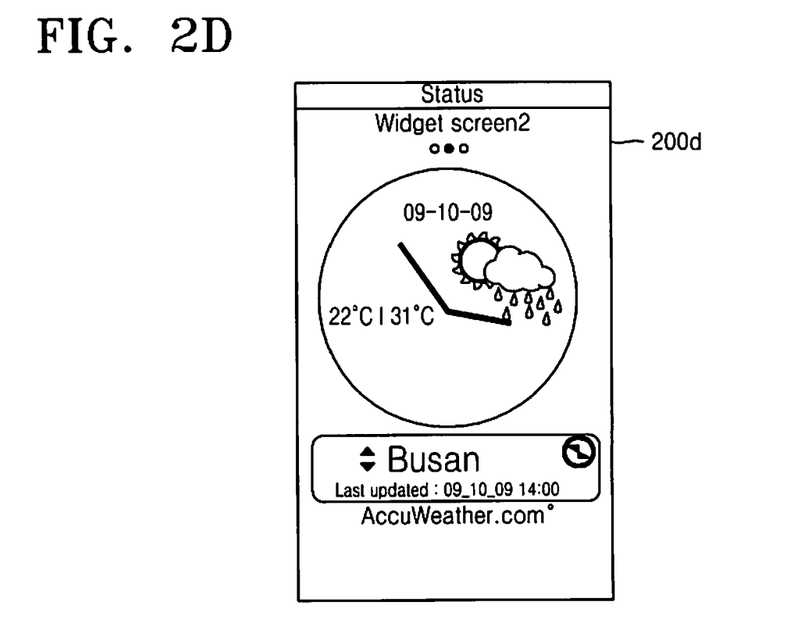

In response to the activation of the icon 230 that sets the specific location through the finger tap, a user interface that sets the specific location is displayed. Referring to FIG. 2C, a user interface 200c that sets the specific location displays a settable specific location 260. For example, if the user selects a specific location such as Busan, the user interface 200c displays a widget screen 200d of FIG. 2D that is a synthesis of a widget regarding Busan weather and a clock widget.

FIGS. 3A through 3D illustrate a widget 300a that is a synthesis of a time widget 310 and information 320 and 330 included in a stock widget (not shown) according to another embodiment of the present invention.

Figure 3A:
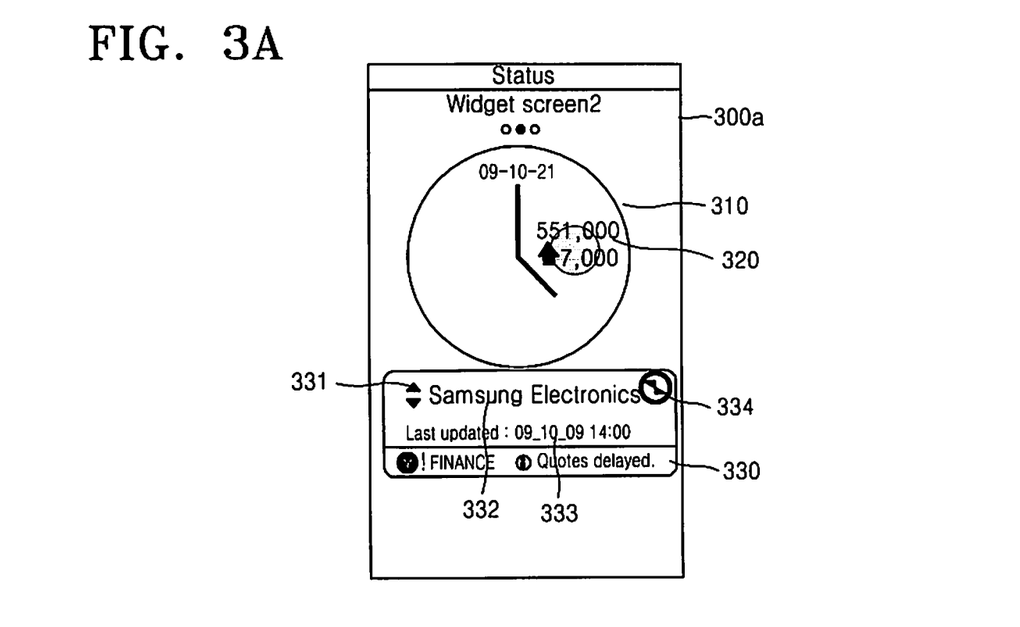
FIGS. 3A through 3D illustrate a widget that is a synthesis of a time widget and stock widgets according to another embodiment of the present invention.

Referring to FIG. 3A, the widget 300a is a synthesis of the time widget 310 and the information 320 and 330 included in stock widget. The time widget 310 illustrates a clock icon in an analog clock form, but may provide a clock icon in a digital clock form.

The information 320 included in the stock widget is displayed on the time widget 310 and may be displayed on the time widget 310 in a text format that is intuitive to stock. Further, the information 320 may present stock and rising/falling prices in colors or diagrams. The information 330 that sets a specific stock icon is displayed outside the clock icon of the clock widget 310 and includes such information as a change key 331 used to change a previously set stock items, a stock item 332, a recently updated time 333, and an update item 334. A user may change a previously set specific location when activating the change key 331 through a finger tap, and may receive stock information regarding a current stock item from a server (not shown) that provides external stock information when activating the update icon 334 through the finger tap. The weather icon 320 shows stock information regarding the stock item 332 at the recently updated time 333.

Figure 3B:
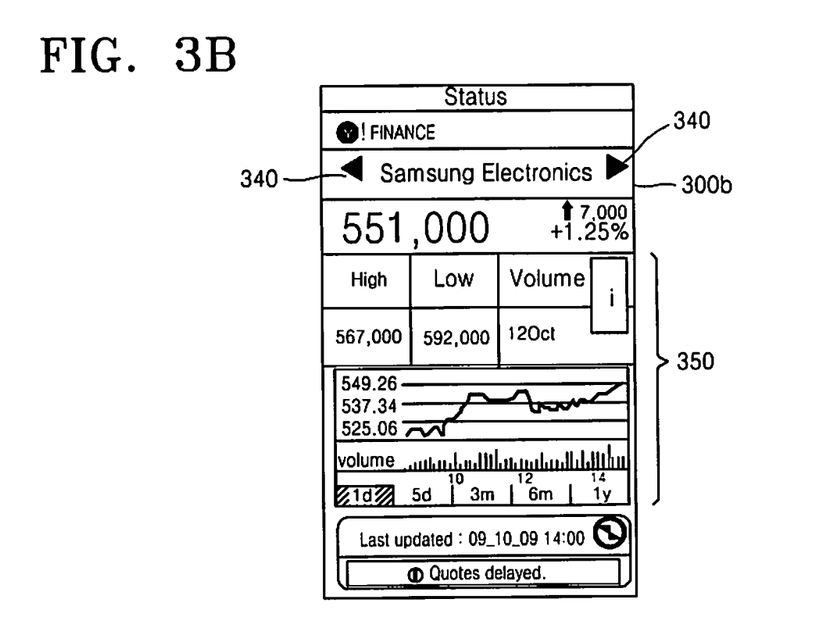

In response to the activation of the icon 320 through the finger tap of the user, a user interface that provides detailed stock information regarding a current stock item is displayed. Referring to FIG. 3B, a user interface 300b that provides detailed stock information may display a change key 340 that changes such information as a stock item, a recently updated date, and an update icon.

Figure 3C:
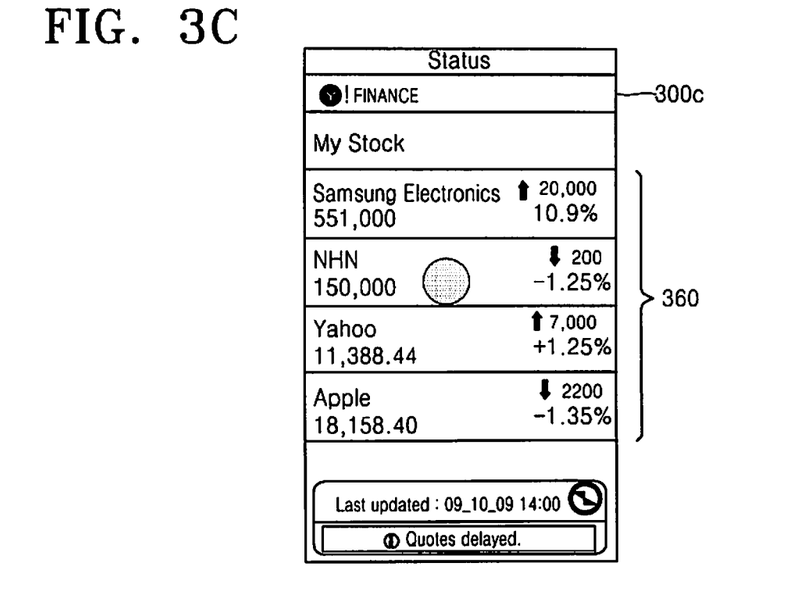
Figure 3D:
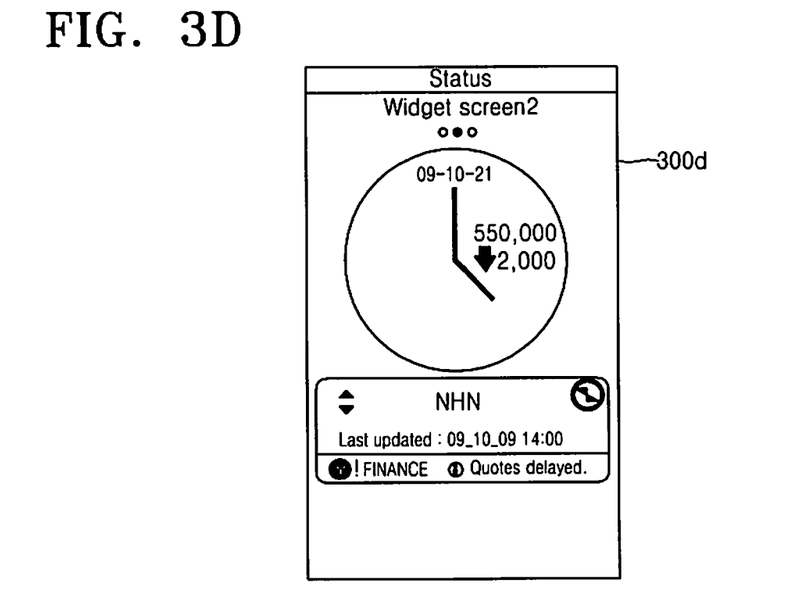

In response to the activation of the information 330 that sets a specific stock item through the finger tap of the user, a user interface that sets the specific stock item is displayed. Referring to FIG. 3C, a user interface 300c that sets the stock item displays a settable stock item 360. The user interface 300c may display such information as a recently updated date and an update icon. For example, if the user selects a specific stock item, such as NHN, the user interface 300c displays a widget screen 300d of FIG. 3D that is a synthesis of a stock widget regarding NHN and a clock widget.

The widget synthesis unit 130 may display the first information included in the second widget relating to time displayed on the first widget and the second information relating to time different from the first information based on a user's selection on the first widget. The widget synthesis unit 130 may display the first information that indicates the attribute of the second widget and is included in the second widget on the clock icon of the clock widget, and may display an icon that provides the second information relating to time other than time displayed on a clock icon included in the second widget based on the user's selection.

For example, the second widget may be an event widget, the first information may be event information relating to the time displayed on the clock icon, and the second information may be event information relating to time other than the time displayed on the clock icon. The widget synthesis unit 130 may display third information indicating all day events included in the second widget outside the clock icon.

FIGS. 4A through 4D illustrate a widget 400*a* that is a synthesis of a time widget 410 and event widgets 420 and 430 according to another embodiment of the present invention.

Figure 4A:
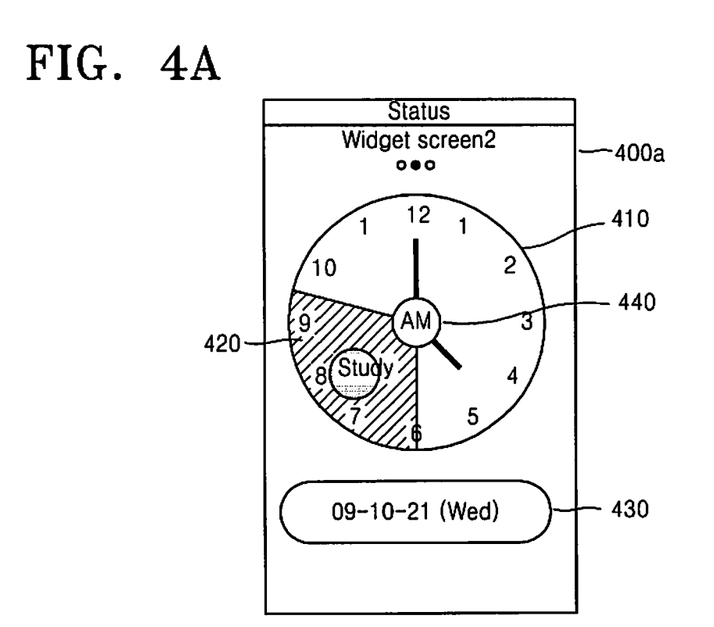
FIGS. 4A through 4D illustrate a widget that is a synthesis of a time widget and event widgets according to another embodiment of the present invention.

Referring to FIG. 4A, the widget 400*a* is a synthesis of the time widget 410 and information 420 and 430 included in the event widget. The time widget 410 illustrates a clock icon in an analog clock form, but may provide a clock icon in a digital clock form.

The information 420 and 430 included in event widget is displayed on the clock widget 410. The information 420 relating to time displayed on a current clock icon may be time-sequentially displayed on a clock icon of the clock widget 410. For example, a study event may be displayed on a clock icon corresponding to 06:00 am-09.20 a.m. The information 430 indicating all day events is displayed outside the clock icon of the clock widget 410. The information 430 may display dates, days, and all day events.

Figure 4B:
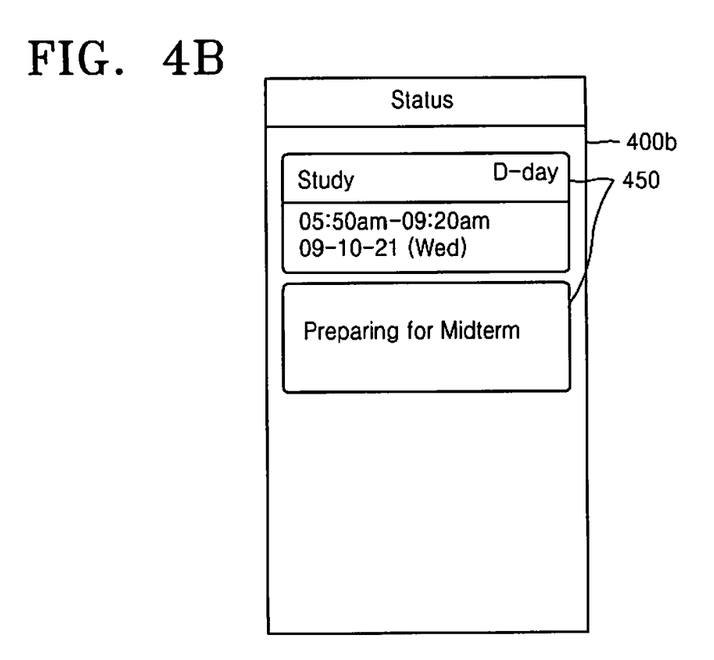

In response to activation of the information 420 relating to time displayed on a current clock icon through a finger tap, a user interface that provides detailed event information regarding an event relating to the time displayed on a current clock icon is displayed. Referring to FIG. 4B, a user interface 400*b* that provides detailed event information specifically displays event information, which may be prepared in a widget or displayed after being received from an event application.

Figure 4C:
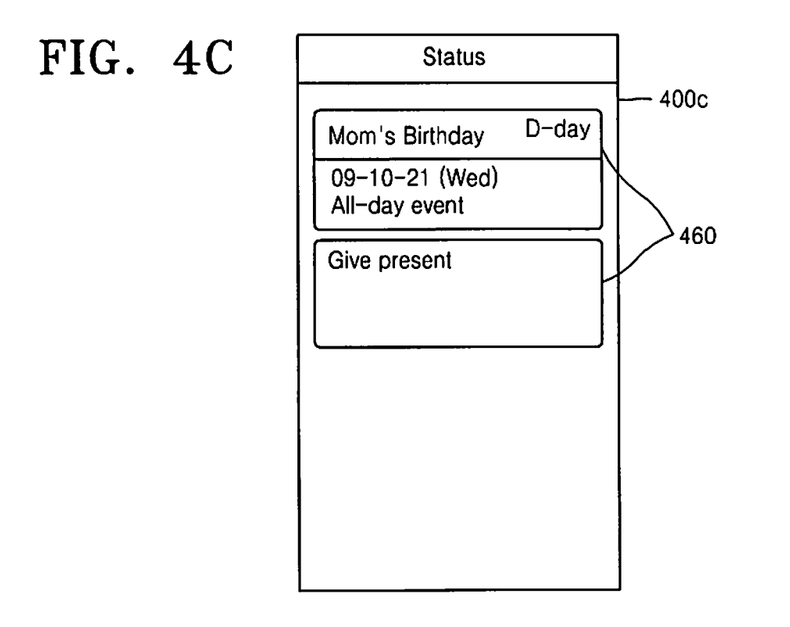

In response to activation of the information 430 indicating all day events through the finger tap, a user interface that provides detailed all day event information is displayed. Referring to FIG. 4C, a user interface 400*c* that provides detailed all day event information displays detailed all day event information 460.

Figure 4D:
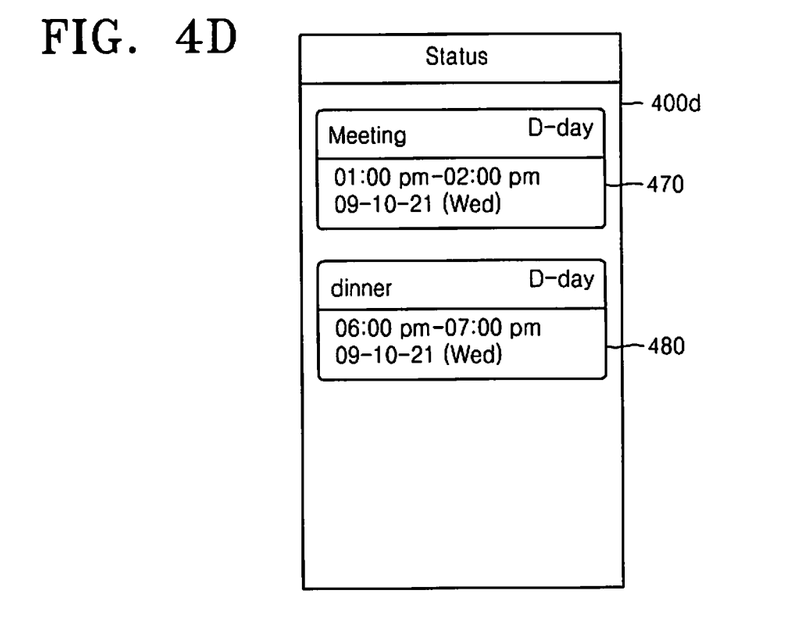

Further, an icon 440 that provides event information relating to time other than time displayed on a clock icon of the clock widget 410 may be displayed on a clock icon. For example, when a user selects the icon 440 indicating AM, a user interface that provides event information corresponding to PM is displayed. Referring to FIG. 4D, a user interface 400*d* that provides the event information corresponding to PM specifically displays event information 470 and 480 corresponding to PM time. Similarly to FIG. 4A, the event information 470 and 480 may be time-sequentially displayed on the clock icon. As described above, when information is toggled and displayed, the information may be effectively displayed on a mobile display device having a limited screen.

Figure 5:
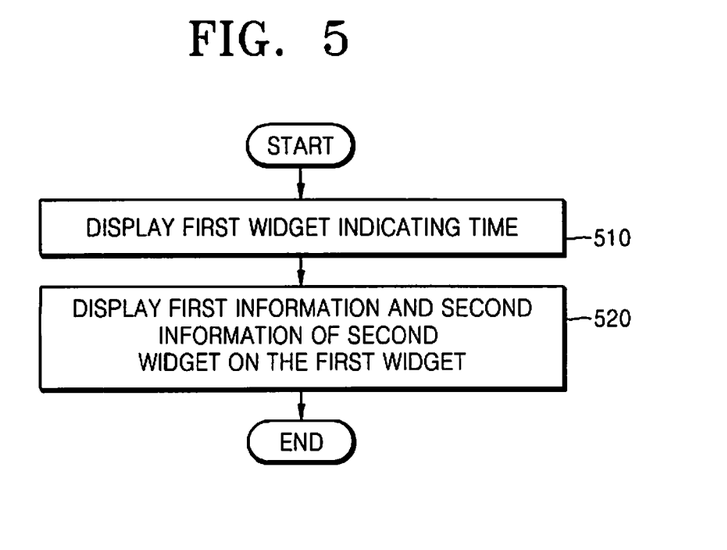
FIG. 5 illustrates a method of providing a widget, according to an embodiment of the present invention.

FIG. 5 illustrates a method of providing a widget, according to an embodiment of the present invention. Referring to FIG. 5, in operation 510, an apparatus for providing the widget displays a first widget indicating time, which first widget may include a clock icon.

In operation 520, the apparatus for providing the widget displays first information and second information included in a second widget on the first widget. The first information indicates an attribute of the second widget. The second information specifies the first information based on a user's selection and may be related or unrelated to time. If the second widget is related to time, it may be displayed on the first widget. The apparatus for providing the widget displays the first information indicating the attribute of the second widget on the clock icon, and displays the second information specifying the first information outside the clock icon based on the user's selection.

For example, if the second widget is a weather widget, the first information may be weather information of a current time, and the second information may be selectable location information. If the second widget is a stock widget, the first information may be stock information of the current time, and the second information may be a selectable stock item. This was described in detail above, and thus a detailed description thereof will be omitted here for purposes of conciseness.

Figure 6:
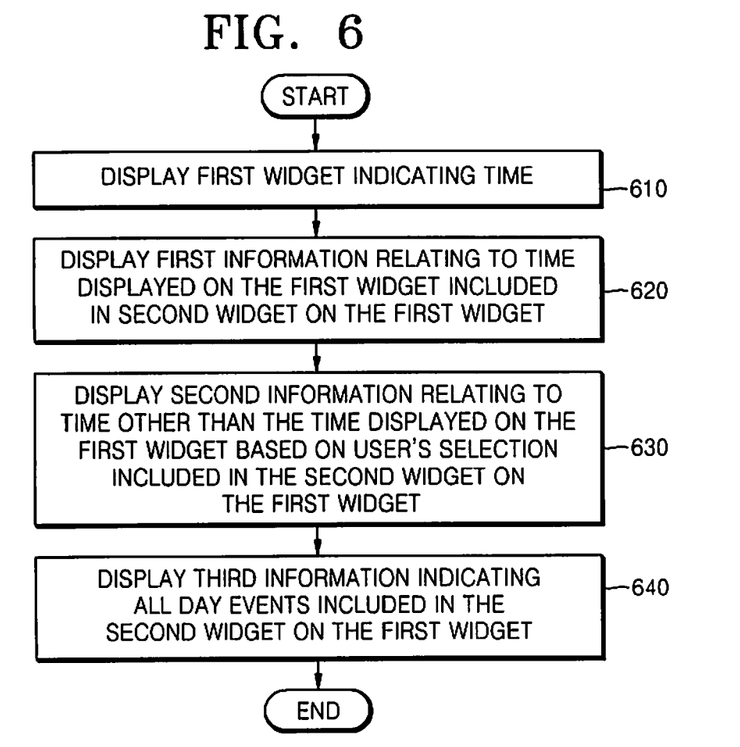
FIG. 6 illustrates a method of providing a widget, according to another embodiment of the present invention.

FIG. 6 illustrates a method of providing a widget, according to another embodiment of the present invention. Referring to FIG. 6, in operation 610, an apparatus for providing the widget displays a first widget indicating time, which first widget may include a clock icon.

In operation 620, the apparatus for providing the widget displays first information relating to time displayed on the first widget. The second widget includes the first information. If the first widget includes a clock icon, the apparatus for providing the widget may display the first information within the clock icon.

In operation 630, the apparatus for providing the widget displays second information relating to time other than time displayed on the first widget based on a user's selection. The second widget includes the second information. If the first widget includes the clock icon, the apparatus for providing the widget may display the second information on a region other than the clock icon. If the first widget includes the clock icon and the second widget is an event widget, the first information is event information relating to time displayed on the clock icon, and the second information is event information relating to time other than the time displayed on the clock icon.

In operation 640, the apparatus for providing the widget displays third information indicating all day events included in the second widget on the first widget. If the first widget includes the clock icon, the apparatus for providing the widget displays the third information outside the clock icon. This was described in detail above, and thus a detailed description thereof will be omitted here for purposes of conciseness.

The invention can also be embodied as computer-readable codes on a computer-readable recording medium. The computer-readable recording medium is any data storage device that can store data that can be thereafter read by a computer system. Examples of the computer-readable recording medium include ROM, RAM, CD-ROMs, magnetic tapes, floppy disks, and optical data storage devices. The computer-readable recording medium can also be distributed over network-coupled computer systems so that the computer-readable code is stored and executed in a distributed fashion. Also, functional programs, codes, and code segments for accomplishing the present invention can be easily construed by programmers of ordinary skill in the art to which the present invention pertains.

While the present invention has been particularly shown and described with reference to embodiments thereof, it will be understood by those of ordinary skill in the art that various changes in form and details may be made therein without departing from the spirit and scope of the present invention as defined by the following claims.

What is claimed is:

1. A method of providing a synthesis widget including widgets having different respective attributes, the method comprising:
- displaying, by a first widget, a first image representing first information;
- displaying on the first image, by a second widget, a second image representing second information corresponding to the first information, wherein the second information of the second widget is synthesized with the first information of the first widget; and
- displaying, along with the first image and the second image, by the second widget, a third image representing third information selected by a user from among a plurality of pieces of selectable information specifying the second information; and
- displaying, by the second widget, a user interface for selecting the third information from among the plurality of pieces of selectable information, when the third image is selected by the user,
- wherein the third image is displayed at a position other than a position where the first image is displayed.

2. The method of claim 1, wherein the first information includes time information, the third information includes location information, and the second information includes weather information corresponding to time displayed by the first widget and location selected by the user.

3. The method of claim 1, wherein the first information includes time information, the third information includes stock item information, and the second information includes stock information corresponding to time displayed by the first widget and stock item selected by the user.

4. The method of claim 1, further comprising displaying, by the second widget, a user interface that provides detailed information regarding the second information, when the second image is selected by the user.

5. An apparatus for providing a synthesis widget including widgets having different respective attributes, the apparatus comprising:
- a display configured to display the synthesis widget;
- a storage unit configured to store a first widget and a second widget; and
- a widget synthesizer configured to display, by the first widget, a first image representing first information, display, on the first image, by the second widget, a second image representing second information corresponding to the first information, wherein the second information of the second widget is synthesized with the first information of the first widget, display, along with the first image and the second image, by the second widget, a third image representing third information selected by a user from among a plurality of pieces of selectable information specifying the second information, and display, by the second widget, a user interface for selecting the third information from among the plurality of pieces of selectable information, when the third image is selected by the user,
- wherein the third image is displayed at a position other than a position where the first image is displayed.

6. The apparatus of claim 5, wherein the first information includes time information, the third information includes location information, and the second information includes weather information corresponding to time displayed by the first widget and location selected by the user.

7. The apparatus of claim 5, wherein the first information includes time information, the third information includes stock information, and the second information includes stock information corresponding to time displayed by the first widget and stock item selected by the user.

8. The apparatus of claim 5, wherein the widget synthesizer displays, by the second widget, a user interface that provides detailed information regarding the second information, when the second image is selected by the user.

9. A non-transitory computer-readable recording medium having recorded thereon a computer program for executing a method of providing a synthesis widget including widgets having different respective attributes, the method comprising:
- displaying, by a first widget, a first image representing first information;
- displaying, on the first image, by a second widget, a second image representing second information corresponding to the first information, wherein the second information of the second widget is synthesized with the first information of the first widget; and
- displaying, along with the first image and the second image, by the second widget, a third image representing third information selected by a user from among a plurality of pieces of selectable information specifying the second information; and
- displaying, by the second widget, a user interface for selecting the third information from among the plurality of pieces of selectable information, when the third image is selected by the user,
- wherein the third image is displayed at a position other than a position where the first image is displayed.

* * * * *